United States Patent
Little et al.

[15] 3,639,115
[45] Feb. 1, 1972

[54] N-(CHLOROPHENOXYACETYL) ETHYLENE UREA HERBICIDES

[72] Inventors: Edwin D. Little, Convent Station, N.J.; Clarence A. Hirsch, Indianapolis, Ind.

[73] Assignee: Allied Chemical Corporation, New York, N.Y.

[22] Filed: May 19, 1969

[21] Appl. No.: 825,986

[52] U.S. Cl. ..............................................71/92, 260/309.7
[51] Int. Cl. ....................................A01n 9/22, C07d 49/30
[58] Field of Search .................................71/92; 260/309.7

[56] References Cited

UNITED STATES PATENTS

| | | | |
|---|---|---|---|
| 2,412,510 | 12/1946 | Jones | 71/117 |
| 2,985,663 | 5/1961 | Carmack et al. | 260/309.7 |

FOREIGN PATENTS OR APPLICATIONS

| | | | |
|---|---|---|---|
| 430,324 | 8/1967 | Switzerland | 71/92 |

*Primary Examiner*—Lewis Gotts
*Assistant Examiner*—Catherine L. Mills
*Attorney*—Patrick L. Henry and Fred L. Kelly

[57] ABSTRACT

N-(Chlorophenoxyacetyl)ethylene ureas are prepared by reacting ethylene urea with a chlorophenoxyacetyl chloride. The products are useful herbicides.

4 Claims, No Drawings

N-(CHLOROPHENOXYACETYL)ETHYLENE UREA HERBICIDES

BACKGROUND OF THE INVENTION

This invention relates to novel compounds useful as herbicides; in particular, it relates to N-(chlorophenoxyacetyl)ethylene ureas and the use thereof as herbicides.

The need to control undesirable plant growth for efficient cultivation of crops has given rise to the development of a great variety of herbicidal agents. However, many of the chemical herbicides available heretofore do not have adequate potency or selectivity to afford optimum results. An effective herbicide must be highly effective against undesirable plants while remaining harmless with respect to the plant being cultivated, such as soybeans, corn, wheat and cotton.

SUMMARY OF THE INVENTION

The novel compounds of the instant invention are N-(chlorophenoxyacetyl)ethylene ureas of the formula:

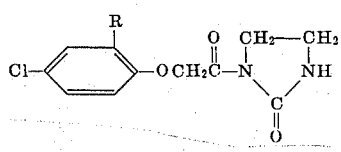

wherein R is methyl or chlorine. The products are useful herbicides.

DETAILED DESCRIPTION OF THE INVENTION

Preparation of the instant compounds is accomplished by reacting ethylene urea (2-imidazolidone) with a chlorophenoxyacetyl chloride, according to the following sequence:

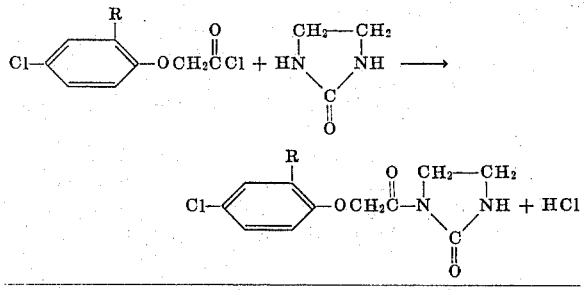

wherein R is as aforesaid. Approximately equimolar amounts of the two reactants are used, although an excess of either may be used to achieve a higher yield with respect to the other.

The reaction is conducted in an inert solvent, e.g., trichloroethylene and carbon tetrachloride, at a temperature generally within the range of about 25°–150° C. Reaction times are dependent upon temperature, with times as short as about 1 hour or less often being adequate. Atmospheric pressure is normally used for the reaction.

The starting materials are readily available by procedures taught in the art. For example, U.S. Pat. No. 2,740,810 teaches the preparation of 2-methyl-4-chlorophenoxyacetic acid by chlorinating cresoxyacetic acid in the presence of 1,2-dichloropropane. The acid can also be prepared by reacting the corresponding chlorophenol with monochloroacetic acid. The acetyl chloride can then be prepared by treating the phenoxyacetic acid with thionyl chloride according to standard procedures.

The instant compounds are unexpectedly effective herbicides in that they are very harmful at low levels to plants normally considered undesirable, such as rape and broadleafed weeds, while being harmless toward such plants as soybeans, corn, wheat and cotton. In addition, these compounds are relatively harmless to grass plants. For this purpose of selectively inhibiting undesirable plant growth, N-(2,4-dichlorophenoxyacetyl)ethylene urea is preferred.

Normally, the instant compounds will be used as the active ingredient in an herbicidal composition, although they might also be used without a carrier. Various diluents and carriers may be employed and the percent of active ingredient may be varied. Although compositions with less than about 0.5 percent by weight of active ingredient may be used, it is preferable to use compositions containing at least about 1.0 percent of active ingredient because otherwise the amount of carrier becomes excessively large. Activity increases with the concentration of active ingredient, which may be 10, 50, 95 percent or even higher.

The amount of composition which is applied for effective herbicidal action is dependent upon considerations such as the type of undesirable plant to be killed, the density of undesirable plants, and soil and climatic conditions. Usually, sufficient composition will be applied to provide about 2–16 pounds of active ingredient per acre.

The instant herbicidal compositions may be in the form of a solution, with the solvent being selected from acetone, benzene, petroleum fractions and the like. These solutions can be applied to the plants in a direct manner such as by spraying, sprinkling, drenching, etc. Water suspensions can also be applied in this manner, with dispersing and emulsifying agents such as sodium alkyl sulfates and sulfonates and the like.

Application can also be achieved by dusting a powder in which the active ingredient is dispersed. Suitable carriers include finely powdered material such as clay, fullers earth, talc, etc.

The instant compounds may constitute the sole active ingredient in the herbicidal compositions, but they might be effectively used in combination with other active ingredients, such as other herbicides, insecticides and other plant treating agents.

The following examples are provided to more fully illustrate the instant invention. They are provided for illustrative purposes only and are not to be construed as limiting the scope of the instant invention, which is defined by the appended claims.

EXAMPLE I

N-(2,4-Dichlorophenoxyacetyl)ethylene urea

A suspension of ethylene urea (8.6 grams) in 600 ml. of trichloroethylene was stirred under reflux conditions while a solution of 2,4-dichlorophenoxyacetyl chloride (23.9 grams) in 60 ml. of trichloroethylene was added dropwise thereto over a period of 3 hours. Refluxing and stirring was continued for another 2 hours. The reaction mixture was then cooled and the product filtered to afford 28 grams (96 percent yield) of material melting at 203°–208° C. Recrystallization from benzene or ethanol afforded pure product as colorless needles, m.p. 209°–210° C.

Anal. Calc'd for $C_{11}H_{10}N_2O_3Cl_2$: C, 45.7; H, 3.46; N, 9.68.
Found: C, 46.05; H, 3.46; N, 9.52.

EXAMPLE II

N-(2-Methyl-4-chlorophenoxyacetyl)ethylene urea

The procedure of example I is repeated wherein an equivalent amount of 2-methyl-4-chlorophenoxyacetyl chloride is substituted for said 2,4-dichlorophenoxyacetyl chloride to afford the desired product.

EXAMPLE III

Herbicidal Activity

The following crop species and weed species were planted in metal flats (12×8.5×4 inches) in greenhouse potting soil containing one-third mixed clay and sand, one-third mushroom soil, and one-third peat moss. The pH of the soil was 6.8–7.2.

Crop species

Corn, *mays*, Hybrid U.S. 13
Wheat, *Triticum vulgare*, variety Thorne
Cotton, *Gossypium, hirsutum*, variety Delta
   Pine Lane Fox No. 20
Soybean, *Soja wax*, variety Wilson Weed species Annual ryegrass, *Lolium multiflorum*
Rape, *Brassica napus*

Each flat received a volume of spray equal to 80 gallons per acre of an acetone solution of N-(2,4-dichlorophenoxyacetyl)ethylene urea. The concentration of the solution was adjusted to provide application of 16 pounds of active ingredient per acre. Immediately after spraying, the test flats were placed in aluminum trays and were irrigated until the surface of the soil in the flat was uniformly moist (at field capacity). Additional subirrigation was provided as needed to maintain moisture. No surface irrigation was applied.

The flats were sprayed within 1 day after seeding in preemergence tests, and 8–10 days after seeding in the postemergence tests. Results were observed 14 days after spraying.

The effect of the herbicide was evaluated in terms of the injury rating index scale, ranging from 0 to 10 as follows:

| | |
|---|---|
| 0 | No apparent injury |
| 1,2,3 | Slight injury |
| 4,5,6 | Moderate injury |
| 7,8,9 | Severe injury (plants will die) |
| 10 | Plants were dead. |

An injury rating of 3 is the maximum tolerated for crops and a rating of 7 is the minimum acceptable on weed plants.

| Plant | Injury Rating | |
|---|---|---|
| | Preemergence | Postemergence |
| Corn | 3 | 0 |
| Wheat | 3 | 0 |
| Cotton | 3 | 6 |
| Soybeans | 3 | 6 |
| Rape | 9 | 10 |

What is claimed is:

1. Herbicidal compositions comprising an effective amount of a compound of the formula

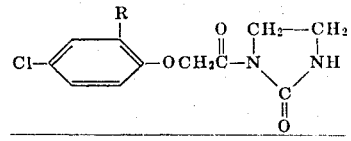

wherein R is methyl or chlorine as the active ingredient, and a carrier.

2. Herbicidal compositions of claim 1 wherein said compound is N-(2,4-dichlorophenoxyacetyl)ethylene urea.

3. The method for inhibiting undesirable plant growth which comprises administering to said plants an effective amount of a compound of the formula

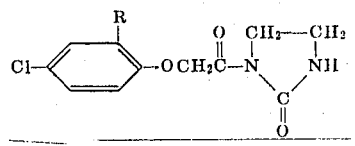

wherein R is methyl or chlorine.

4. The method of claim 3 wherein said compound is N-(2,4-dichlorophenoxyacetyl)ethylene urea.

* * * * *